(12) United States Patent
Tarr

(10) Patent No.: US 8,584,430 B2
(45) Date of Patent: Nov. 19, 2013

(54) ANCHOR BOLT TENSIONING PROCESS

(76) Inventor: Jesse Tarr, Lake Orion, MI (US)

(*) Notice: Subject to any disclaimer, the term of this patent is extended or adjusted under 35 U.S.C. 154(b) by 23 days.

(21) Appl. No.: 13/477,762

(22) Filed: May 22, 2012

(65) Prior Publication Data

US 2013/0000245 A1 Jan. 3, 2013

Related U.S. Application Data

(60) Provisional application No. 61/503,397, filed on Jun. 30, 2011.

(51) Int. Cl.
*E04B 1/00* (2006.01)
(52) U.S. Cl.
USPC .................................................. 52/745.21
(58) Field of Classification Search
USPC ........ 52/745.21, 223.4, 223.6, 223.8, 223.13, 52/223.14, 514, 514.5
See application file for complete search history.

(56) References Cited

U.S. PATENT DOCUMENTS

| | | | | |
|---|---|---|---|---|
| 3,385,469 A | * | 5/1968 | Gaines | 220/327 |
| 5,826,304 A | * | 10/1998 | Carlson | 16/225 |
| 5,826,387 A | * | 10/1998 | Henderson et al. | 52/295 |
| 7,155,875 B2 | * | 1/2007 | Henderson | 52/741.15 |
| 7,707,797 B2 | * | 5/2010 | Henderson | 52/745.17 |
| 7,805,895 B2 | * | 10/2010 | Kristensen | 52/169.9 |
| 8,206,056 B2 | * | 6/2012 | O'Banion et al. | 404/6 |
| 8,240,096 B2 | * | 8/2012 | Kim | 52/223.14 |
| 2006/0265981 A1 | * | 11/2006 | Brackett | 52/223.1 |
| 2012/0180426 A1 | * | 7/2012 | Bromer | 52/831 |

* cited by examiner

*Primary Examiner* — Mark Wendell
(74) *Attorney, Agent, or Firm* — Blue Filament Law PLLC; Avery N. Goldstein

(57) ABSTRACT

A process for improving structural integrity of a structure is provided that includes retensioning a plurality of anchor bolts installed on the structure to a final load P, for each of a set of anchor bolts at a first time. A bolt stretch, B is measured for each of the set of anchor bolts. The structural integrity of the structure is found by solving an equation for each of the anchor bolts to determine a value of as found load on a bolt. Through monitoring the set of anchor bolts at a later time for changes in F for the anchor bolts, changes in the structure are detected and repaired before further damage occurs to the structure or the associated equipment. The structural failing are assessed in a number of ways including evaluating the values F as a function of the position of each of the tensioning anchor bolts.

8 Claims, 2 Drawing Sheets

_US 8,584,430 B2_

ANCHOR BOLT TENSIONING PROCESS

RELATED APPLICATIONS

This application claims priority benefit of U.S. Provisional Application Ser. No. 61/503,397 filed Jun. 30, 2011.

FIELD OF THE INVENTION

The present invention in general relates to a process for measuring structure installed anchor bolt tension and in particular to the maintenance of structure operational lifetime using anchor bolt tension data so generated.

BACKGROUND OF THE INVENTION

Anchor bolts are used to secure a variety of structures including bridges; buildings; and towers including those for communications and wind turbine generators. Loose anchor bolts can lead to grout failure under the flange of the base section of the structure. Grout failure can ultimately lead to a structure that is not level, thus rendering the structure unsafe or inoperable Loose anchor bolts are a compounding problem in that a loose anchor bolt tends to lead to the loosening of neighboring bolts. As more bolts loosen the problem is propagated and if left unchecked can lead to a catastrophic structural failure.

If loose anchor bolts are found, it can be from a multitude of reasons. Examples include but are not limited to failure of the supporting grout, failure of the supporting foundation such as fracturing or uneven settling, improperly tensioned anchor bolts from prior workmanship, long term anchor bolt relaxation and/or defective anchor bolts. It is important to establish precise records of the bolts tension to better determine if there are issues and the possible root of changes in bolt tension.

With regard to a wind turbine, synonymously referred to herein as a wind turbine generator or a WTG, a base section that is out of level by fractions of an inch will lead to several inches or feet out of level at the top of the tower. The generator, gearbox, bearings, and other components that rest at the top of the tower, must be precisely balanced for the wind turbine generator to operate properly. If such components are out of balance, it leads to the failure to one or more of the mentioned components and it is costly to fix such issues. Loose anchor bolts can ultimately lead to the collapse of the turbine, but are more often associated with failing concrete and/or grout under at the base of the tower. If bolts are left untensioned for a period of time, the bolts can weaken and eventually fracture, potentially leading to tower collapse.

Being able to determine and document the actual load that anchor bolts are holding is crucial to making educated decisions and assumptions about the anchoring system for the life of the structure and beyond. Prior art attempts to do so have involved implanted sensors and complex processes that are difficult to maintain and the inclusion of sensors within bolts actually reduces their effectiveness to bear the structure load.

Thus, there exists a need for a simple method to measure and monitor the tension on an installed anchor bolt of a structure. There also exists a need to improve structure lifetime through implementing a program of routine anchor bolt monitoring and retensioning.

SUMMARY OF THE INVENTION

A process for improving structural integrity of a structure is provided that includes re-tensioning a plurality of anchor bolts installed on the structure to a final load P, for each of a set of anchor bolts at a first time. A bolt stretch, B is measured for each of the set of anchor bolts. The structural integrity of the structure is found by solving the equation for each of the anchor bolts:

$$F = kP - (BAE)/L \quad (I)$$

where F is a value of as found load on a bolt, P is a final load on the bolt, B is the measured bolt stretch from as found load F to final load P, A is the cross sectional area of the bolt, E is a bolt modulus of elasticity, L is a length of the bolt under tension and k is a unit specific constant. Through monitoring the set of anchor bolts at a later time for changes in F for at least one bolt of the anchor bolts changes in the structure are detected and repaired before further damage occurs to the structure or the associated equipment. The structural failing are assessed in a number of ways including evaluating the values F as a function of the position of each of the tensioning anchor bolts. Repairs can be made to structures such as towers, wind turbines, and bridges. Repairs often include repairing grout and defective bolt replacement.

DESCRIPTION OF THE INVENTION

The present invention has utility as a process for measuring structure installed anchor bolt tension and in particular to ensuring the structures operational lifetime using anchor bolt tension data so generated. An inventive process relies on a field tension gauge and micrometer to measure tension applied and bolt length and correlating these according to Equation 1 thus allowing one to rapidly and simply determine bolt tension and thereby not only adjust bolt tension to preselected values, but also identify potential sources of integrity compromise for the structure supported by the bolts. The present invention is particularly beneficial in the context of maintaining a structure balanced by opposing tensioning bolts, such as a tower and in particular a WTG tower. With a peripheral array of opposing tensioned anchor bolts, a deviation in tensioning of a first bolt transfers uneven loading to surrounding bolts, leading to non-uniform pressure on the structure foundation, which are known to causes of previously mentioned issues with the concrete and grout.

According to the present invention, the tension on an anchor bolt is measured as to a bolt axial length change as a simple way to extrapolate the existing tension on bolt. Bolt tension is determined according to the present invention by solving Equation 1:

$$F = kP - (BAE)/L \quad (I)$$

where F is the as found load on the bolt in pounds, P is the final load on the bolt in pounds, B is the measured bolt stretch from as found load F to final load P, A is the cross sectional area of the bolt in square inches, E is the bolt modulus of elasticity, and L is the length of the bolt in inches. Equation 1 is noted to be a linear equation that applies for the recommended, range of loadings for a given bolt, yet breaks down when the bolt is overloaded to beyond maximal loading where intrinsic elasticity is lost and the bolt suffers irreversible deformation. It is appreciated that the expression of equation I is readily done in other units with the usage of appropriate constants associated with the unit analysis as noted by the constant k. In the units of, equation I given above k is 1.

By way of example and to illustrate units for Equation (I), let:
P=62 kilopounds (kips) (62,000 lb.), B=1.1 mm=0.0433" (1.1/25.4), A=1.25" (#10), E=29,000,000 (#10 grade 75) and L=124", then $$F=62,000-(0.0433\times1.25\times29,000,000/124)$$

$$F=62,000-(1,569,625/124)$$

$$F=62,000-12,658$$

$$F=49,342 \text{ lb.}=49.34 \text{ kips.}$$

Figure 1:
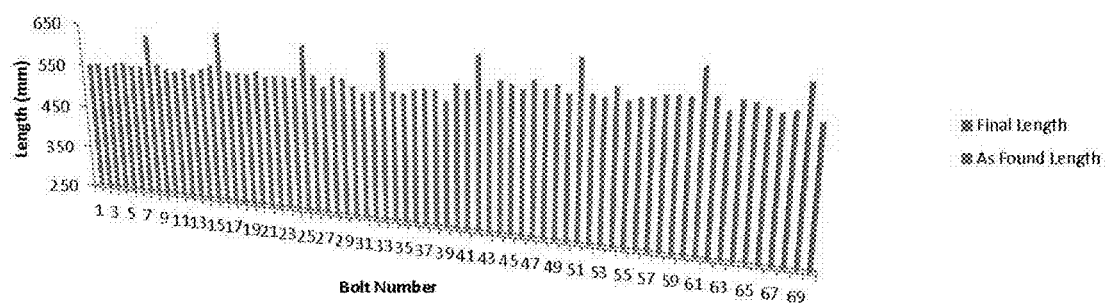
FIG. 1 is a graph of anchor bolt stretch in millimeters as a function of bolt number around a structure.
Figure 2:
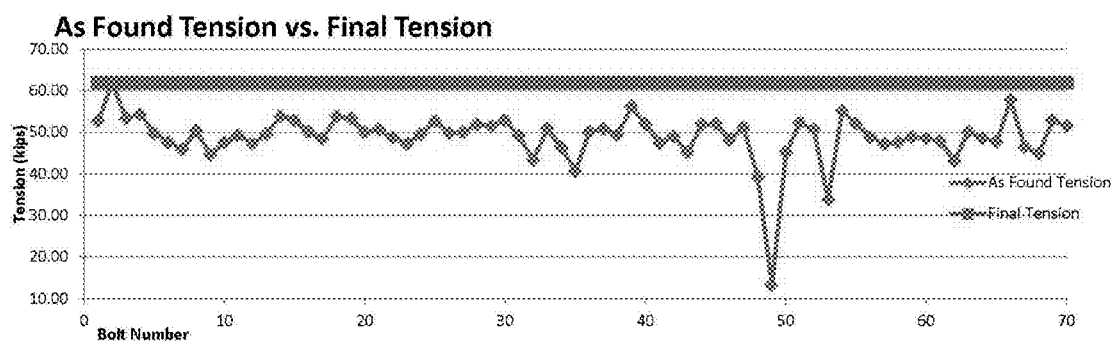
FIG. 2 is a plot of as found (F value in Equation 1 and denoted by diamonds) and after tensioning (P value in Equation 1 and denoted by squares) for the bolts of FIG. 1.

Equation (I) is utilized in an inventive process by measuring values of P and B as part of servicing a structure, along with either the measured or reference values for A, E, and L being used to determine F, the as found or initial bolt tension prior to retensioning to a final value P. Values generated by solving Equation (I) are used to map bolt length and tensioning profiles for the structure, as shown in FIGS. 1 and 2, respectively. The structure is then evaluated based on these values for potential integrity problems. Integrity problems readily identified by the present invention illustratively include non-uniform foundation settling, defective anchor bolts or mechanically coupled components thereto, superstructure load shifting or cracking, grout disintegration, failing concrete, improper previous workmanship, defective anchor bolts and/or anchoring system failure. Such possible problems are then further investigated by conventional means and remediated before further damage results to the structure.

Bolt elongation is readily measured by conventional techniques illustratively including micrometer measurement, indicator washers, datum rod bolts, and ultrasonic sensors. Other bolt specific information are provided by the manufacturer of the bolt as the value E, modulus of elasticity.

The present invention is further illustrated with resort to the following non-limiting example. This example should not be construed as limiting the scope of the appended claims.

EXAMPLE

A wind turbine generator tower having 70 anchor bolts forming a peripheral circular array securing the tower flange to a foundation is tested according to the present invention with the values of bolt elongation, as found, and final tension for each of the bolts being measured and recorded. Final tension is determined by a calibrating device as is known to the art. These values are found in Table 1 and FIGS. 1 and 2. The values noted for arbitrarily numbered bolts 48-53 being a clustered group of under-tensioned bolts are investigated and determined to be consistent with an area of grout failure. Upon further review it is determined that the area of loose anchor bolts has grout failing and must be repaired. Upon completion of an approved process for repairing the failing grout, the bolts are again tested and found to be holding their desired load, thus ensuring operational reliability of that structures foundation anchoring system.

TABLE 1

Measured initial and final bolt tensions for tower structure and corresponding kips on the bolts.

| BOLT # | As found length mm | Final Length mm | Bolt Stretch mm | As Found Tension kips | Final Tension kips |
|---|---|---|---|---|---|
| 1 | 274.18 | 275 | 0.82 | 52.67 | 62 |
| 2 | 276.7 | 276.71 | 0.01 | 61.89 | 62 |
| 3 | 272.83 | 273.59 | 0.76 | 53.35 | 62 |
| 4 | 277.84 | 278.51 | 0.67 | 54.38 | 62 |
| 5 | 279.11 | 280.18 | 1.07 | 49.83 | 62 |
| 6 | 275.85 | 277.11 | 1.26 | 47.67 | 62 |
| 7 | 275.42 | 276.83 | 1.41 | 45.96 | 62 |
| 8 | 313 | 314.02 | 1.02 | 50.40 | 62 |
| 9 | 279.37 | 280.9 | 1.53 | 44.59 | 62 |
| 10 | 275.68 | 276.94 | 1.26 | 47.67 | 62 |
| 11 | 272.52 | 273.64 | 1.12 | 49.26 | 62 |
| 12 | 277.21 | 278.5 | 1.29 | 47.32 | 62 |
| 13 | 272.44 | 273.53 | 1.09 | 49.60 | 62 |
| 14 | 278.28 | 278.99 | 0.71 | 53.92 | 62 |
| 15 | 284.09 | 284.89 | 0.8 | 52.90 | 62 |
| 16 | 320.94 | 321.99 | 1.05 | 50.06 | 62 |
| 17 | 277.95 | 279.14 | 1.19 | 48.46 | 62 |
| 18 | 277.22 | 277.93 | 0.71 | 53.92 | 62 |
| 19 | 276.14 | 276.9 | 0.76 | 53.35 | 62 |
| 20 | 280.32 | 281.38 | 1.06 | 49.94 | 62 |
| 21 | 275.03 | 276.03 | 1 | 50.62 | 62 |
| 22 | 277.2 | 278.36 | 1.16 | 48.80 | 62 |
| 23 | 277.5 | 278.8 | 1.3 | 47.21 | 62 |
| 24 | 276.29 | 277.38 | 1.09 | 49.60 | 62 |
| 25 | 313.11 | 313.92 | 0.81 | 52.79 | 62 |
| 26 | 280.73 | 281.8 | 1.07 | 49.83 | 62 |
| 27 | 268.45 | 269.51 | 1.06 | 49.94 | 62 |
| 28 | 281.31 | 282.19 | 0.88 | 51.99 | 62 |
| 29 | 279.75 | 280.67 | 0.92 | 51.53 | 62 |
| 30 | 271.75 | 272.55 | 0.8 | 52.90 | 62 |
| 31 | 265.06 | 266.19 | 1.13 | 49.15 | 62 |
| 32 | 268.11 | 269.75 | 1.64 | 43.34 | 62 |
| 33 | 312.27 | 313.25 | 0.98 | 50.85 | 62 |
| 34 | 269.1 | 270.48 | 1.38 | 46.30 | 62 |
| 35 | 267.91 | 269.78 | 1.87 | 40.73 | 62 |
| 36 | 273.3 | 274.35 | 1.05 | 50.06 | 62 |

TABLE 1-continued

Measured initial and final bolt tensions for tower structure and corresponding kips on the bolts.

| BOLT # | As found length mm | Final Length mm | Bolt Stretch mm | As Found Tension kips | Final Tension kips |
|---|---|---|---|---|---|
| 37 | 275.13 | 276.12 | 0.99 | 50.74 | 62 |
| 38 | 274.52 | 275.63 | 1.11 | 49.37 | 62 |
| 39 | 264.46 | 264.98 | 0.52 | 56.08 | 62 |
| 40 | 283.4 | 284.28 | 0.88 | 51.99 | 62 |
| 41 | 277.3 | 278.58 | 1.28 | 47.44 | 62 |
| 42 | 314.76 | 315.9 | 1.14 | 49.03 | 62 |
| 43 | 278.87 | 280.36 | 1.49 | 45.05 | 62 |
| 44 | 289.54 | 290.43 | 0.89 | 51.88 | 62 |
| 45 | 286.97 | 287.85 | 0.88 | 51.99 | 62 |
| 46 | 282.03 | 283.24 | 1.21 | 48.24 | 62 |
| 47 | 292.39 | 293.35 | 0.96 | 51.08 | 62 |
| 48 | 283.54 | 285.54 | 2 | 39.25 | 62 |
| 49 | 287.69 | 291.97 | 4.28 | 13.31 | 62 |
| 50 | 280.57 | 282.05 | 1.48 | 45.16 | 62 |
| 51 | 318.74 | 319.59 | 0.85 | 52.33 | 62 |
| 52 | 282.63 | 283.63 | 1 | 50.62 | 62 |
| 53 | 279.3 | 281.78 | 2.48 | 33.79 | 62 |
| 54 | 292.18 | 292.79 | 0.61 | 55.06 | 62 |
| 55 | 278.24 | 279.11 | 0.87 | 52.10 | 62 |
| 56 | 281.87 | 283.02 | 1.15 | 48.92 | 62 |
| 57 | 283.29 | 284.59 | 1.3 | 47.21 | 62 |
| 58 | 286.99 | 288.26 | 1.27 | 47.55 | 62 |
| 59 | 287.64 | 288.79 | 1.15 | 48.92 | 62 |
| 60 | 286.7 | 287.89 | 1.19 | 48.46 | 62 |
| 61 | 317.05 | 318.29 | 1.24 | 47.89 | 62 |
| 62 | 288.48 | 290.14 | 1.66 | 43.12 | 62 |
| 63 | 275.71 | 276.75 | 1.04 | 50.17 | 62 |
| 64 | 287.64 | 288.82 | 1.18 | 48.58 | 62 |
| 65 | 285.95 | 287.21 | 1.26 | 47.67 | 62 |
| 66 | 282.43 | 282.8 | 0.37 | 57.79 | 62 |
| 67 | 277.3 | 278.66 | 1.36 | 46.53 | 62 |
| 68 | 280.3 | 281.81 | 1.51 | 44.82 | 62 |
| 69 | 308.55 | 309.35 | 0.8 | 52.90 | 62 |
| 70 | 271.66 | 272.58 | 0.92 | 51.53 | 62 |

The foregoing description is illustrative of particular embodiments of the invention, but is not meant to be a limitation upon the practice thereof. The following claims, including all equivalents thereof, are intended to define the scope of the invention.

The invention claimed is:

1. A process for improving structural integrity of a structure comprising:
   re-tensioning a plurality of anchor bolts installed on the structure to a final load P, for each of said plurality of anchor bolts at a first time;
   measuring a measured bolt stretch, B for each said plurality of anchor bolts;
   solving the equation for each of said plurality of anchor bolts:

$$F = kP - (BAE)/L \quad (I)$$

where F is a value of as found load on a bolt, P is a final load on the bolt, B is the measured bolt stretch from as found load F to final load P, A is the cross sectional area of the bolt, E is a bolt modulus of elasticity, L is a length of the bolt under tension and k is a unit specific constant; and monitoring said plurality of anchor bolts at a later time for changes in F for at least one bolt of said plurality of bolts to improve the structural integrity of the structure.

2. The process of claim 1 further comprising determining, a structural failing of the structure based on the values of F as measured between the first time and the second time.

3. The process of claim 1 further comprising repairing the structure based on the values of F.

4. The process of claim 1 wherein the repairing the structure includes grout stabilization.

5. The process of claim 1 wherein the structure is a tower or a bridge.

6. The process of claim 1 wherein the structure is wind turbine tower.

7. The process of claim 1 wherein further comprising mapping at least one of F, P, or B onto a positional arrangement of said plurality of anchor bolts.

8. The process of claim 1 further comprising replacing at least one of said plurality of bolts based on the values of F for the at least one bolt at the first time and the second time.

* * * * *